UNITED STATES PATENT OFFICE.

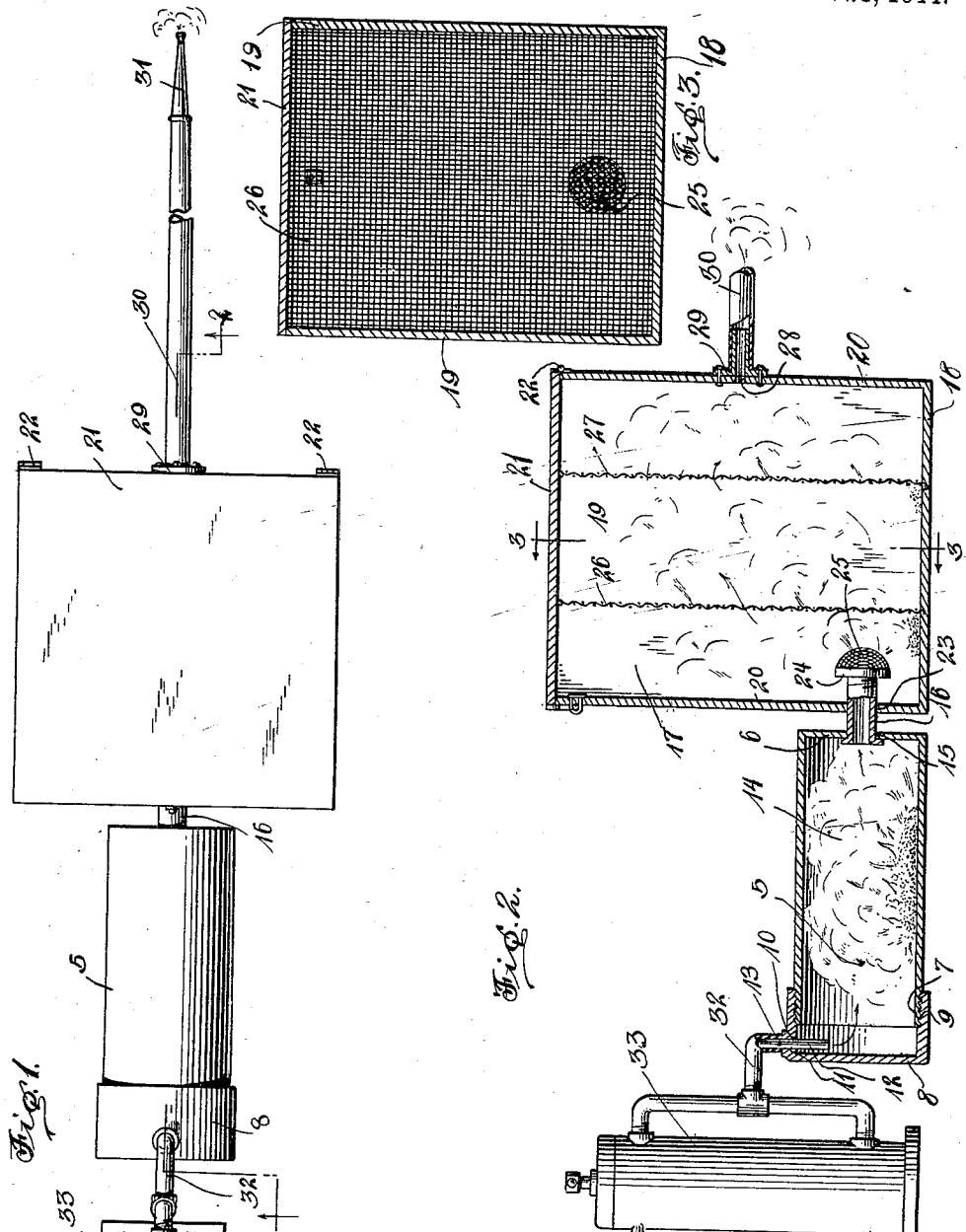

LEWIS T. BREKKE, OF WALLACE, SOUTH DAKOTA.

ANIMAL-SMOKER.

1,009,042.  Specification of Letters Patent.  Patented Nov. 21, 1911.

Application filed March 4, 1911. Serial No. 612,370.

*To all whom it may concern:*

Be it known that I, LEWIS T. BREKKE, a citizen of the United States, residing at Wallace, in the county of Codington, State of South Dakota, have invented certain new and useful Improvements in Animal-Smokers; and I do hereby declare the following to be a full, clear, and exact description of the invention, such as will enable others skilled in the art to which it appertains to make and use the same.

This invention relates to an improvement in animal exterminators, of that class which is commonly known as animal smokers.

The principal object of the invention is to provide an apparatus in which smoke or other noxious vapors are generated and then forced into the holes of burrowing pests, such as rats, gophers, squirrels, and the like.

Another object of the invention is to provide an apparatus for the purpose described, in which means are provided for preventing sparks or any solid matter from passing therefrom, thereby avoiding any danger of setting fire to the place.

A still further object of the invention is to provide an apparatus of the class described which is composed of several elements that are detachably connected, and which, when in set relation, are capable of being separated with ease and despatch.

A still further object of the invention is to provide an apparatus of the character described which, is extremely simple in construction, positive in operation, and cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawing: Figure 1 is a top plan view of the apparatus, Fig. 2 is a longitudinal sectional view taken on the line 2—2 of Fig. 1, and Fig. 3 is a transverse sectional view taken on the line 3—3 of Fig. 1.

Like reference numerals designate corresponding parts in all the figures of the drawing.

Referring to the drawing, the invention comprises a tube 5 preferably formed of any suitable metal, having a substantially closed end 6 and an open threaded end 7. A closure cap 8 is provided with a threaded wall 9 adapted to engage the said threaded end 7. Formed in the wall 9 is an opening 10 and seated within said opening and fixedly secured to the wall is a nipple 11, one end 12 thereof projecting inwardly and the other end 13 projecting outwardly. Within this tube 5 is adapted to be positioned a mixture of tobacco and sulfur, as indicated by reference numeral 14. Formed in the end 6 of the tube is an opening 15 and seated within said opening, and outwardly projecting therefrom, is a nipple 16.

The invention further comprises a smoke chamber 17 which includes a bottom 18, side walls 19, end walls 20, and a top 21, the latter being connected to one of the walls by hinges 22. Formed in one of the end walls 20 of the receptacle is an opening 23, said opening being disposed in alinement with the opening 15 of the tube 5 and adapted to receive the nipple 16. A frame 24 is suitably secured to the projecting end of the nipple 16 for supporting a wire screen 25. Vertically arranged within the chamber and disposed transversely thereof is a plurality of wire screens 26 and 27 respectively. Formed in the opposite end wall 20, and preferably centrally thereof is an opening 28, and secured to the exterior of said wall is a coupling 29 adapted for connection with one end of a flexible hose 30. The free end of the hose 30 is provided with a nozzle 31 of any suitable construction.

Connecting the outer end 13 of the nipple 11 is one end of a flexible pipe 32, the other end of said pipe being suitably connected to a double acting air pump 33 as will be readily understood.

In operation the closure cap 8 is removed, and the mixture contained within the tube is ignited. The cap is then replaced and the pipe 32 is connected with the nipple 13. The nozzle 31 is positioned within an opening and the pump 33 is then operated. The air will pass from said pump through the pipe 32, through the nipple 11 and into the tube 5. The air will thus be caused to act upon the burning material similar to an ordinary draft, and as a result, the smoke resulting therefrom will pass through the nipple 16, through the screen 25 carried thereby, and into the smoke chamber 17. Any sparks or solid material, which may have passed through the screen 25, will engage the first screen 26 and be caused to drop to the bottom 18 of said receptacle. Should sparks or solid material pass through this screen they will strike the second screen 27 and be caused to drop to the bottom 18 of the receptacle. The smoke will then pass through the coupling 29, out through the pipe 30, through the nozzle 31 thereof, and into the opening formed by the animal.

What is claimed is:—

An animal exterminator comprising in combination, a fuel chamber formed of tubing having one end closed and the other end open, a closure cap for said open end including a wall having an opening, a nipple disposed within the opening and secured to the wall, one end of said nipple projecting inwardly and the other end outwardly from said wall, a smoke chamber, a nipple connecting the closed end of the fuel chamber and the smoke chamber, a screen disposed within the smoke chamber and secured to the nipple, a hose connected to the smoke chamber, spaced screens disposed within the smoke chamber intermediate the connecting nipple and the hose, and a pump connected to the nipple of the closure cap of the fuel chamber.

In testimony whereof, I affix my signature, in presence of two witnesses.

LEWIS T. BREKKE.

Witnesses:
E. A. ADAMS,
F. B. STEVENS.

---

Copies of this patent may be obtained for five cents each, by addressing the "Commissioner of Patents, Washington, D. C."